(12) United States Patent
Muylkens et al.

(10) Patent No.: US 11,660,945 B2
(45) Date of Patent: May 30, 2023

(54) DIVISION SET OF A FRAMELESS WINDOW AND ANOTHER ADJACENT WINDOW OF A CAR

(71) Applicant: AGC GLASS EUROPE, Louvain-la-Neuve (BE)

(72) Inventors: Philippe Muylkens, Welkenraedt (BE); Robert Hick, Chenee (BE); Jiri Machacek, Teplice (CZ); Roman Hynek, Teplice (CZ)

(73) Assignee: AGC GLASS EUROPE, Louvain-la-Neuve (BE)

( * ) Notice: Subject to any disclaimer, the term of this patent is extended or adjusted under 35 U.S.C. 154(b) by 170 days.

(21) Appl. No.: 15/744,530

(22) PCT Filed: Jul. 12, 2016

(86) PCT No.: PCT/EP2016/066495
§ 371 (c)(1),
(2) Date: Jan. 12, 2018

(87) PCT Pub. No.: WO2017/009320
PCT Pub. Date: Jan. 19, 2017

(65) Prior Publication Data
US 2018/0208036 A1    Jul. 26, 2018

(30) Foreign Application Priority Data

Jul. 15, 2015  (EP) .................................... 15176878

(51) Int. Cl.
*B60J 10/777*    (2016.01)
*B60J 10/18*    (2016.01)
(Continued)

(52) U.S. Cl.
CPC ............. *B60J 10/777* (2016.02); *B60J 10/18* (2016.02); *B60J 10/24* (2016.02); *B60J 10/77* (2016.02); *B60J 10/78* (2016.02)

(58) Field of Classification Search
CPC . B60J 10/777; B60J 10/18; B60J 10/24; B60J 10/77; B60J 10/78
See application file for complete search history.

(56) References Cited

U.S. PATENT DOCUMENTS 4,370,832 A * 2/1983 Koike ...................... B60J 10/74
49/490.1
5,261,721 A   11/1993 Conger et al.
(Continued)

FOREIGN PATENT DOCUMENTS

DE    10 2010 023 984       * 12/2011
DE    10 2010 023 984 A1    12/2011
(Continued)

OTHER PUBLICATIONS

International Search Report dated Oct. 14, 2016 in PC/EP016/066495 filed Jul. 12, 2016.

*Primary Examiner* — Gregory J Strimbu
(74) *Attorney, Agent, or Firm* — Obion, McClelland, Maier & Neustadt, L.L.P.

(57) ABSTRACT

A division set for sealing a first retractable frameless window of a car and a second window of the car, the second window adjacent to the first window. The division set includes a profile, to be secured to the second window, and a gasket for sealing the two windows. The gasket of a desired shape is made of a TPE material encapsulated with the profile of the division set.

13 Claims, 5 Drawing Sheets

(51) Int. Cl.
  *B60J 10/78* (2016.01)
  *B60J 10/77* (2016.01)
  *B60J 10/24* (2016.01)

(56) References Cited

U.S. PATENT DOCUMENTS

| | | | | |
|---|---|---|---|---|
| 5,331,767 | A * | 7/1994 | Takeuchi | B60J 10/777 |
| | | | | 49/475.1 |
| 8,667,739 | B2 * | 3/2014 | Brookman | E06B 7/23 |
| | | | | 49/495.1 |
| 8,832,998 | B2 * | 9/2014 | Kuwabara | E06B 7/2309 |
| | | | | 49/440 |
| 9,038,319 | B2 * | 5/2015 | Kuwabara | B60J 10/048 |
| | | | | 49/498.1 |
| 2001/0034976 | A1 * | 11/2001 | Maass | B60J 10/24 |
| | | | | 49/441 |
| 2008/0224501 | A1 * | 9/2008 | Zimmer | B60J 1/08 |
| | | | | 296/201 |
| 2009/0001755 | A1 * | 1/2009 | Fuetterer | B60J 5/0409 |
| | | | | 296/146.16 |
| 2011/0030282 | A1 * | 2/2011 | Ruppert | B29C 45/14467 |
| | | | | 49/506 |
| 2011/0109009 | A1 | 5/2011 | Guellec | |
| 2012/0159861 | A1 * | 6/2012 | Mori | B60J 10/248 |
| | | | | 49/495.1 |
| 2014/0007511 | A1 * | 1/2014 | Franzen | F16B 5/121 |
| | | | | 49/483.1 |
| 2016/0001645 | A1 * | 1/2016 | Ortmueller | B60J 10/18 |
| | | | | 403/288 |
| 2016/0325609 | A1 * | 11/2016 | Yu | B60J 10/45 |

FOREIGN PATENT DOCUMENTS

| | | | |
|---|---|---|---|
| FR | 2 932 127 | * | 12/2009 |
| JP | 1-154014 U | | 10/1989 |
| WO | 2006/067622 A1 | | 6/2006 |
| WO | WO 2010/001016 | * | 1/2010 |

* cited by examiner

DIVISION SET OF A FRAMELESS WINDOW AND ANOTHER ADJACENT WINDOW OF A CAR

BACKGROUND a. Field

The field of the instant application is the sealing between two adjacent side windows of a car, with a division set in between.

More precisely, since usually the two side windows of concern are both retractable, the division set is secured to one of them, the rear one, the front one being frameless.

In this case, when the rear window is pivoted or slided down to its open state, the division set, from a vertical position, moves to an horizontal position, flush with the edge of the door or the belt line of the car.

b. Description of the Related Art

The sealing of the windows, in their closure state, has been provided up to now by an EPDM gasket fixed inside the profile of the division set secured to the rear window (glass), generally glued to it. The profile is usually made of metal, preferably of aluminium or steel, or plastic material.

In other words, sealing the side windows of a car, of which one is a frameless retractable window, involved to 1) secure a profile to one of the two windows, 2) to seal a gasket to the other window and 3) to secure the gasket to the profile.

It should be pointed out that, since when the rear of the two windows is movable, it is pivoted or slided, while the front window, definitely movable, is moved first in an horizontal translation prior to be vertically translated downwards, the division set is at the very outset secured to the rear window.

Moreover, reference has been made to two side windows of a car, whereas the problems that will be presented below could as well be related to a part of windows of which one would be the backlite.

EPDM (ethylene-propylene-diene-monomer) is a thermo-curing material and the gasket is obtained and shaped through vulcanization/extrusion.

First, the quality of EPDM has quite decreased recently because of a lack of rubber of good quality.

Second, the current systems are difficult to industrialize.

Vulcanization is a process difficult to manage.

Two different materials are needed for the gasket, one, rather hard and rigid, to be secured to the profile of the division set through a mechanical sliding operation—either by hand or with the use of a robot—and the other one, softer and rather flexible to insure the sealing function with acceptable compression force.

Furthermore, the sealing part of the gasket is shaped with a longitudinal form—a hole—to be blocked up on top of the division set by a finishing cap. When the windows are in their closure state, the cap should be inserted into a further sealing profile along the e-line of the roof of the car, the thickness of the cap having for that reason to be progressively reduced.

The cap has accordingly to be produced through a separate process prior to be fixed to the gasket, this resulting in a weld line which is unaesthetic, with the further risk that during closing of the (rear) window, the end cap folds in the wrong direction.

Finally, the rubbing of the EPDM material is also a drawback for the final use of the product and, to reduce the effect of it, a slip agent has to be added to the gasket, this bringing an additional step in the manufacturing of the product, without mentioning the gluing step for securing the profile to the rear window.

The invention of the instant case aims to obviate all these difficulties.

SUMMARY

To this end, the invention relates first to a division set for sealing a first retractable frameless window of a car and a second window of the car, adjacent to the first one, including a profile, to be secured to the second window, and a gasket for sealing the two windows, characterized in that the gasket of a desired shape is made of a TPE material encapsulated with the profile of the division set.

By encapsulation, it is meant that the thermoplastic elastomer (TPE) material had been injected into a mould including the profile.

The interest of the division set of the invention is that, instead of providing by extrusion a gasket of a desired shape and then securing it to a profile, in two steps, the gasket of the instant division set is designed with the desired shape and secured to the profile in just one step, thanks to the nature of TPE material.

This is the reason of the inventive step of the instant invention.

Preferably, the profile of the division set of the instant case includes an end cap encapsulated therewith.

To insure the compressibility of the gasket during the closing of the frameless window, the gasket might be provided with a hole or a hole may be provided between the encapsulated gasket and the profile.

Another possibility would be to use some lips rather than a hole in order to simplify the process.

Possibly, a hard material as for example PP which can be potentially filled with glass fibers can be added to secure the profile to the glass in order to improve the global stiffness of the assembly.

The invention also relates, within the same inventive concept, to an assembly of a first retractable frameless window of a car, a second window of the car, adjacent to the first one, and a division set with a profile and a sealing gasket for sealing the two windows, characterized in that the gasket of a desired shape is made of a TPE material and the second window of the car, the gasket and the profile of the division set are encapsulated.

Thus, the TPE material is used to directly make the shape of the gasket and secure the profile to the second window of the car.

Again within the same inventive concept, the invention also relates to the manufacturing of the hollow sealing division set.

Thus, the invention relates to a process for manufacturing a division set for sealing a first retractable frameless window of a car and a second window of the car, adjacent to the first one, including a profile, to be secured to the second window, and a gasket for sealing the two windows, characterized in that it comprises the steps of making a mould corresponding to a desired shape of the gasket and a desired shape of the profile;

introducing the profile into the mould;

injecting a TPE material into the mould for forming the gasket with no hole encapsulated with the profile;

making a hole in the gasket and extracting the encapsulated gasket and profile out of the mould.

Advantageously, the second window of the car is also introduced into the mould prior to injecting the TPE material for encapsulating the second window, the profile and the gasket together.

Preferably, the hole is made in the gasket by means of the well known technique of the gas assist injection moulding (GAIM), for instance described in the article "Gas—Injection Moulding with Dupont engineering polymers 05.96H-23259).

According to a further implementation, the manufacturing process could be characterized in that it comprises the steps of
 a. making a first part of a mould corresponding to a desired shape of one side of a first part of the gasket;
 b. making a second part of the mould corresponding to a desired shape of the opposite side of the first part of the gasket, intended to face the profile;
 c. making third and fourth parts of the mould corresponding to a desired shape of the profile and desired shapes of one side and opposite side, respectively, of a second part of the gasket,
 d. making a fourth part of the mould corresponding to a desired shape of the opposite side of the second part of the gasket;
 e. joining the first and second parts of the mould and injecting a TPE material into the mould for forming the first part of the gasket;
 f. taking away the first part obtained at step e from the mould and placing said first part and the profile in the third part of the mould;
 g. joining the various parts of the mould and injecting a TPE material into the mould for forming the whole gasket encapsulated with the profile with a hole between the gasket and the profile; and
 h. extracting the division set.

Advantageously, the second window of the car is also introduced into the mould comprising the first and second parts of it prior to injecting the TPE material for encapsulating together the second window and the first part of the gasket.

Thanks to the moulding process of the invention, the end cap can be directly encapsulated, without any welding line leading to a nice finishing of the product.

According to another embodiment of the present invention, the invention relates also to a process for manufacturing a division set for sealing a first retractable frameless window of a car and a second window of the car, adjacent to the first one, including a profile, to be secured to the second window, and a gasket for sealing the two windows, characterized in that it comprises the steps of
 a. making a mould corresponding to a desired shape of the gasket and a desired shape of the profile
 b. making a long core inside the mold, called "slider", which will be able to slide forward and backward, in order to form the hollow part of the gasket
 c. introducing the profile into the mould in contact with the slider
 d. close the mold with the slider in the close position, namely at the position in which the gasket will be molded
 e. injecting a TPE material into the mold for forming the gasket completely, including the top cap
 f. open the mold carefully to extract the long slider out of the gasket shape
 g. extracting the encapsulated gasket and profile out of the mould.

Advantageously, the second window of the car is also introduced into the mould prior to injecting the TPE material for encapsulating the second window, the profile and the gasket together.

Preferably, the hole is made in the gasket by means of the long slider, and the extraction could be ease by the addition of a slipping coating on the long core and/or the addition of an air blowing system inside the core, to prevent the sticking effect of the TPE onto the slider. The air blowing system would be integrated inside the long core through a main channel which will be connected to the skin of the TPE by micro holes According to another embodiment of the present invention, the manufacturing process could be characterized in that it comprises the steps of
 a. making a first part of a mould corresponding to a desired shape of one side of a first part of the gasket designed in a flat position, which means not final position, corresponding to a desired shape of the profile
 b. making a second part of the mould corresponding to a desired shape of the opposite side of the first part of the gasket in a flat position,
 c. making a third and fourth part of the mould corresponding to a desired shape of the opposite side of the second part of the gasket;
 d. joining the first and second parts of the mould and injecting a TPE material into the mould for forming the first part of the gasket; Inject the first part of the gasket in a flat position to insure the positioning of the profile and the glass and fix them together thanks to the first part of the gasket injected
 e. taking away the first part obtained at the first step from the mould
 f. folding the flat lip in a bended position, corresponding to the final position of the one part of the gasket, with integrated support inside the profile to hold the lip at the bended position
 g. placing said first part after folding in the profile in the third part of the mould;
 h. joining the various parts of the mould and injecting a TPE material into the mould for forming the whole gasket encapsulated with the profile with a hole between the gasket and the profile; and
 i. extracting the division set.

Advantageously, the second window of the car is also introduced into the mould comprising the first and second parts of it prior to injecting the TPE material for encapsulating together the second window and the first part of the gasket.

BRIEF DESCRIPTION OF THE DRAWINGS

The invention shall be better understood in the light of the following description and attached drawings, wherein.

DETAILED DESCRIPTION

Figure 1:
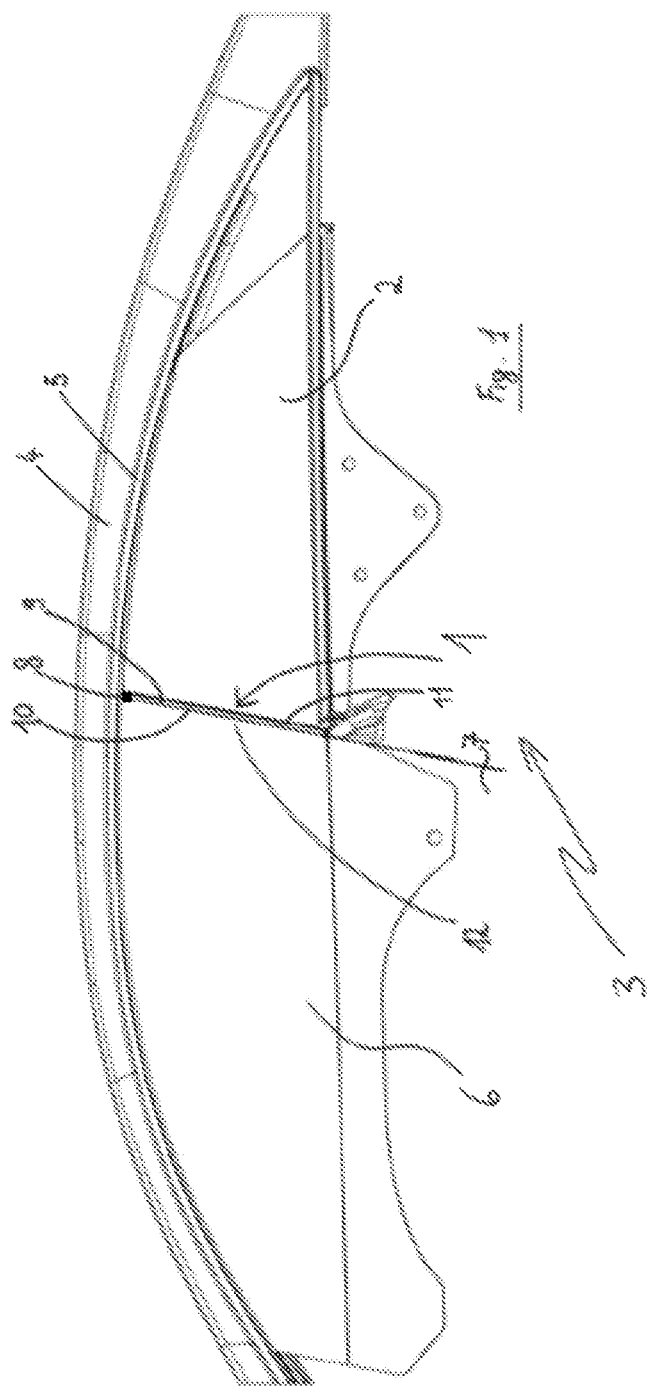
FIG. 1 is a partial view of the left side of a coupe.

Referring to FIG. 1, a division set 1 is mounted on the front edge of the retractable rear window 2 of the left side of a coupe car 3. The car has a roof 4 with an e-line 5.

The division set 1 is intended to provide sealing means between the rear window 2 and the adjacent front window 6 of the front left door 7 of the car. On FIG. 1, on top of the division set 1, an end cap 8 can be seen, to be inserted, in the closure state, in a sealing profile (not shown) provided along the e-line 5.

Window 6 is a retractable frameless window.

The division set 1 includes a profile 9, which is the member which is secured to the rear window 2, and a sealing gasket 10.

The gasket 10 has a desired shape, which will be described in reference with the other FIGS. 2-5, is made of a thermoplastic elastomer (TPE) material and is encapsulated with the profile 9. A TPE material is a material easy to transform and to shape.

Different materials can be used, such as vulcanized thermoplastic (TPV), styrenic thermoplastic (TPS), thermoplastic olefin (TPO), thermoplastic urethane (TPU). A low compression set level is preferably used, for instance smaller than 50% according to the ISO 815 standard. A predetermined shore A hardness of the material is also preferably used, for instance between 50 and 80 according to the ISO 868 standard.

It should be understood that the division set of the invention could be proposed for all types of car with no fixed pillar between two adjacent windows one of which is retractable and frameless, or, and preferably, between two moving side windows. The group of such cars includes coupé, convertible, sedan, touring, station wagon, bus (considered here similar to a car), . . .

The division set of the invention could also be proposed on fixed window such as a quarter lite fixed in order to seal the rear moving window.

Prior to reverting to the encapsulation process and the manufacturing of the division set, it should be pointed out that the end cap 8 is encapsulated during the same step of encapsulation of the profile 9 and the gasket 10.

Figure 2:
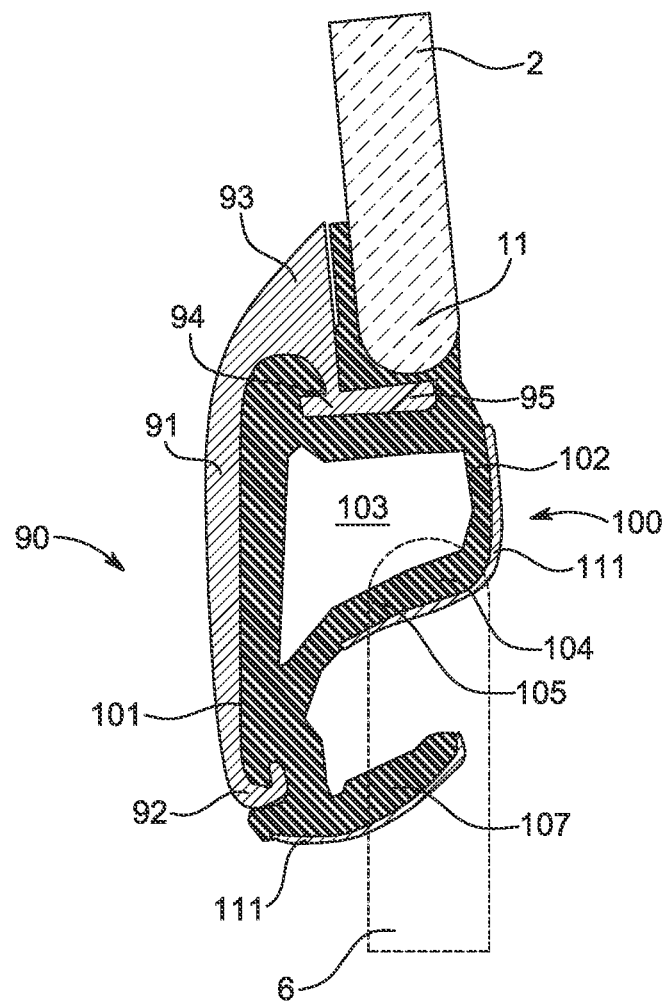
FIG. 2 is a cross-sectional view of a first embodiment of the division set of the invention, in the open state.

Reverting to FIG. 2, showing a first embodiment of the division set of the invention, this division set includes an inner profile 90, here made of aluminium, and outer sealing gasket 100 made of a TPE material.

The profile 90 has a general shape of a large longitudinal beam 91 with a hooked front edge 92 and a much thicker hooked rear edge 93 terminated by a small narrow longitudinal interior beam 94 orthogonal to the large beam 91. The length of the profile corresponds to the height of the front edge 11 of the rear window 2. The width of the profile 90, from one hooked edge to the other, corresponds roughly to the width of the gasket 100. The internal surface of the beam 91 of the profile is here slightly rounded.

The gasket 100 has an inner surface 101 plated against the outer surface of the profile 90. The general shape of the gasket looks like an irregular parallelepipedic body 102 of the same length as the profile 90.

The body 102 of the gasket is a hollow body, with a hole 103 full of air for assuming the sealing function.

The hole 103 provides the gasket with a sealing arm 104 of which the cross-section includes the orthogonal branches 105, 106 giving this cross-section the shape of an L. The arm 104 extends roughly from the front edge 92 of the profile 90 to the bottom edge 95 of the narrow beam 94 of the profile.

Figure 3:
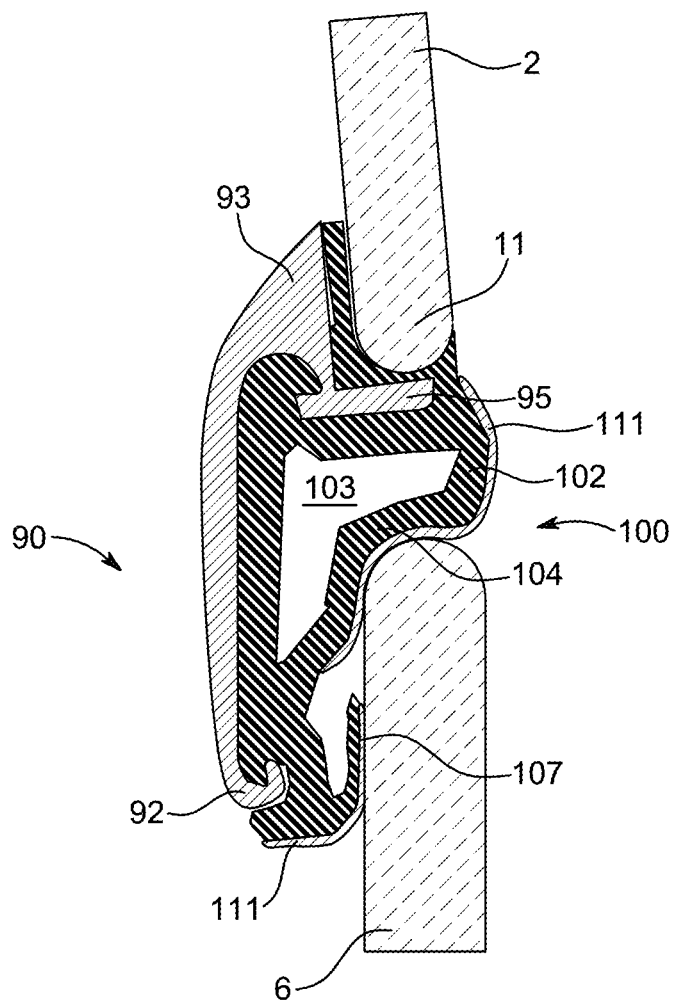
FIG. 3 is a cross-sectional view of the division set of FIG. 2 in the closure state.

For sake of the sealing function, arm 104 can get out of shape when it is pushed by window 6 (FIG. 3). Arm 104 insures the compressibility of the gasket during the closing of the windows.

Projecting out of the body 102, in the region of the front edge 92 of the profile 90, is a tongue 107 which can be folded back to the body 102 under the action of window 6 (FIG. 3). Possibly, hard material, as for example polypropylene (PP) which can be potentially filled with glass fibers, can also be used to secure the profile on the glass.

The process for manufacturing the division set of FIG. 2 will now be described.

The two parts of a mould corresponding to the shapes of the profile 90 and gasket 100 are prepared. They are also prepared taking into account that window 2 will be also encapsulated with the profile and the gasket.

The profile 90 and the front edge 11 of window 2 are introduced into the mould which is then closed.

A TPE material is injected into the mould for forming the gasket, with no hole, and for encapsulating the three components 11, 2; 90; 100.

Then, hole 103 is made by the technique of the gas assist injection moulding, when the TPE material is still partially melted.

Finally, the mould is opened and the assembly of the window 11, 2, the profile 90 and the gasket 100 is extracted out of the mould.

After installation of the assembly on the car 3, when the frameless front window 6 is moved upwards, the rear edge 12 of the front window 6 compresses arm 104 of the gasket which gets out of shape while folding tongue 107 back to the body 102 of gasket 100 (FIG. 3). In case of use of a hard material to secure the profile on the glass, this material is injected after or before the TPE in a classical 2K process for example.

Figure 4:
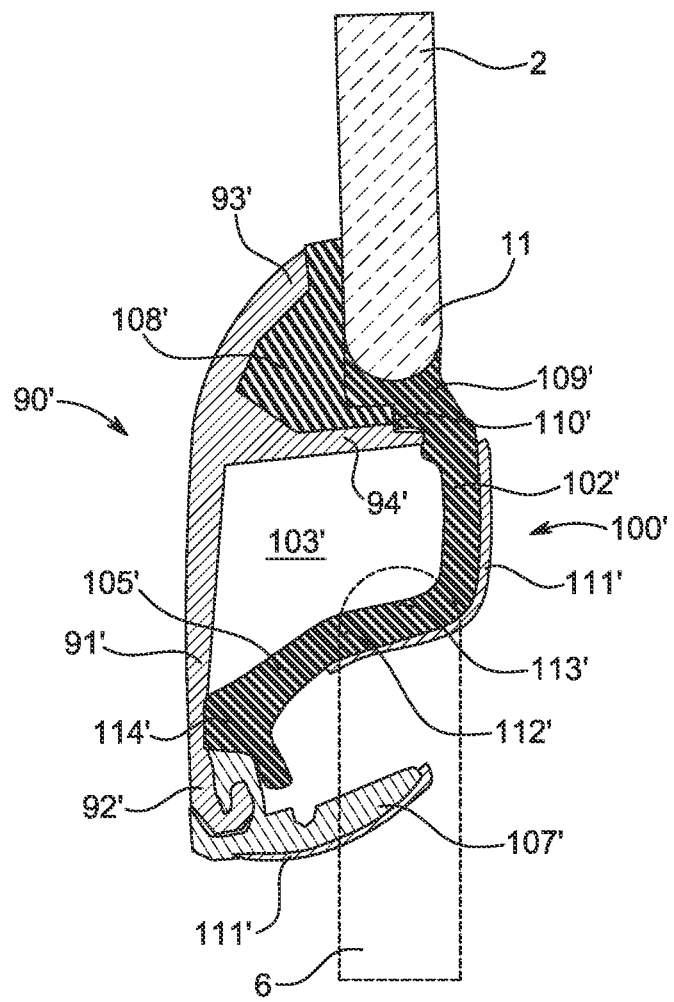
FIG. 4 is a cross-sectional view of a second embodiment of the division set of the invention, in the open state
Figure 5:
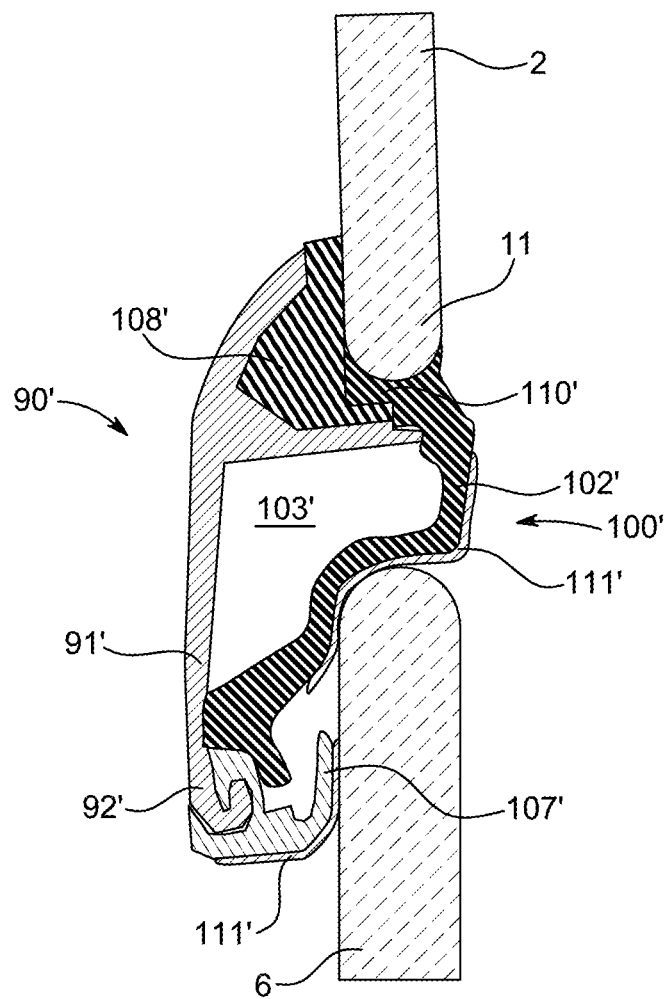
FIG. 5 is a cross-sectional view of the division set of FIG. 4 in the closure state.

The second embodiment of the division set and assembly of the invention, shown on FIGS. 4, 5, is very similar to the first embodiment of FIGS. 2, 3.

The gasket 100' includes a sealing arm 104', with two branches 105', 106' also shaped like an L in cross-section.

Unlike for the first embodiment, the manufacturing process of the division set 100', including the gasket 100' and the profile 90', includes two steps of encapsulation instead of just one for the first embodiment.

However, on the inventive point of view, the two encapsulation steps should be looked at as if it were a simple step, since the encapsulation of the rear window 2 and the sealing arm 104', which is the first part of the gasket, takes place in one step and the encapsulation of the profile 90' and the second part of the gasket, pursuant to which the gasket 100' is secured to the profile 90', also takes place in just one step.

The reason for that is that because of the engagement of the profile 90' and the sealing arm 104', the sealing hole 103' in between is totally preserved during the second encapsulation step and the TPE material is injected therein.

The second part of the gasket 100' includes, like in the first embodiment, a sealing tongue 107', to be folded back to the body 102' of the gasket under the action of window 6, and a rear portion 108' engaging a rear portion 93' of the profile 90', the rear end 109' of the sealing branch 106' and the front edge 11 of window 2.

The profile 90' still has a hooked front edge 92', but the rear part of it includes the rear portion 93' and a flat skirt 94' generally perpendicular to the beam part 91' of the profile 90'. Possibly, hard material, as for example polypropylene (PP) which can be potentially filled with glass fibers, is used to secure the profile on the glass. In that case, the rear portion 108' is made with this hard material.

The manufacturing process includes the steps of:
a. making a first part of a mould corresponding to a desired shape of one side 112' of a first part 104' (the sealing arm) of the gasket 100';

b. making a second part of the mould corresponding to a desired shape of the opposite side 113' of the first part 104' of the gasket 100', intended to face the profile 90';
c. making a third part of the mould corresponding to a desired shape of the profile 90' and a desired shape of one side of a second part 107', 108' (the sealing tongue and the rear portion) of the gasket 100';
d. making a fourth part of the mould corresponding to a desired shape of the opposite side of the second part 107' of the gasket 100';
e. joining the first and second parts of the mould and injecting a TPE material into the mould for forming the first part 104' of the gasket 100';
f. taking away the first part 104' obtained at step e from the mould and placing said first part 104' and the profile 90' in the third part of the mould;
g. joining the various parts of the mould and injecting a TPE material into the mould for forming the whole gasket 100' encapsulated with the profile 90' with a hole 103' between the gasket 100' and the profile 90'; and
h. extracting the division set.

In the real operation, the front end 11 of window 2 is introduced into the mould prior to step e, so that, after step g, the whole product, including the division set, is extracted.

During the second encapsulation step, the hooked front edge 92' of the beam 91' of the profile abuts on the front edge 114' of the sealing branch 105' of the sealing arm 104' and the free edge 110' of the skirt 94' of the profile abuts on the rear end 109' of the branch 106' of the sealing arm 104' of the gasket for providing the hole 103', the arm 104' facing the beam 91' and the skirt 94' of the profile. Again, the encapsulation process with a TPE material is an easy and rather cheap one. TPE material is delivered in granular form easy to be molten prior to be injected into the mould where it is transformed prior to become solid again.

The tongue and the sealing arm of the gasket could be coated with a slip agent 111, 111' in order to insure correct sliding of the windows during closing.

In case of use of hard material, the sealing arms 104' and the tongue 107' are made at the same time by TPE encapsulation. The rear portion 108' is then made in another step by encapsulation of a hard material.

The invention claimed is:
1. An assembly comprising:
a first retractable frameless window of a car,
a second window of the car, adjacent to the first window, and
a division set with a profile and a sealing gasket for sealing the two windows,
wherein the sealing gasket of a desired shape is made of a thermoplastic elastomer material and the second window of the car, and the sealing gasket and the profile of the division set are co-molded together,
wherein an only material between the profile and the second window is the thermoplastic elastomer material which has been injected into a mold during co-molding with the profile of the division set,
wherein the first and second windows each have a first surface and a second surface opposite the first surface, and
wherein the thermoplastic elastomer material of the gasket is configured to contact the first interior surfaces of the first and second windows window and to not contact the second exterior surfaces of the first and second windows window.

2. The assembly of claim 1, wherein the profile of the division set includes an end cap co-molded with the division set.

3. The assembly of claim 1, wherein the gasket is provided with a hole.

4. The assembly of claim 1, wherein the gasket is provided with lips.

5. The assembly of claim 1, wherein the profile has a surface not covered by the thermoplastic elastomer material.

6. The assembly of claim 1, wherein the second window is retractable.

7. The assembly of claim 1, wherein a hole is provided between the co-molded gasket and the profile.

8. The assembly of claim 1, wherein the gasket completely covers one end of the second window along a length of the gasket.

9. The assembly of claim 1, wherein the thermoplastic elastomer material is selected from the group consisting of vulcanized thermoplastic, styrenic thermoplastic, thermoplastic olefin, and thermoplastic urethane.

10. The assembly of claim 1, wherein the second window comprises a glass sheet.

11. The assembly of claim 1, wherein the thermoplastic elastomer material has compression set level smaller than 50% according to the ISO 815 standard.

12. The assembly of claim 1, wherein the thermoplastic elastomer material has a shore A hardness of between 50 and 80 according to the ISO 868 standard.

13. The assembly of claim 1, wherein the profile is made of aluminum.

* * * * *